Feb. 25, 1969   P. RICHARDSON ETAL   3,430,126
MULTI-PHASE ALTERNATING CURRENT GENERATOR HAVING OUTPUT WINDING
PHASE DISPLACEMENT AND COMPENSATING TRANSFORMERS
Filed Aug. 24, 1966   Sheet _1_ of 3

INVENTORS
*PHILIP RICHARDSON*
*NORMAN YOUNG*

BY *Larson and Taylor*

ATTORNEYS

INVENTORS
*PHILIP RICHARDSON
NORMAN YOUNG*

INVENTORS
PHILIP RICHARDSON
NORMAN YOUNG
BY Larson and Taylor
ATTORNEYS

United States Patent Office 3,430,126
Patented Feb. 25, 1969

3,430,126
MULTI-PHASE ALTERNATING CURRENT GENERATOR HAVING OUTPUT WINDING PHASE DISPLACEMENT AND COMPENSATING TRANSFORMERS
Philip Richardson and Norman Young, Newcastle-upon-Tyne, England, assignors to C. A. Parsons & Company Limited, Newcastle-upon-Tyne, England, a corporation of Great Britain
Filed Aug. 24, 1966, Ser. No. 574,584
Claims priority, application Great Britain, Aug. 25, 1965, 36,453/65
U.S. Cl. 322—90  6 Claims
Int. Cl. H02p 9/02

This invention relates to multi-phase alternating current apparatus and is concerned particularly, though not exclusively, with alternating current generators, of large output for power station use, and their associated transformers.

Alternating current generators for use in modern power stations normally have a three-phase stator winding with field coils in the rotor, the output being of the order of 500 megawatts or above at speeds of 3000 r.p.m. or 3600 r.p.m. The transformer associated with the generator normally has its primary windings, which are connected to the generator, in a delta connection, and its secondary windings, which are connected to the supply, in a star connection.

The trend is to provide machines of still larger output, and increases in output lead inherently to increases in the terminal voltage of the generator. A limit is imposed on the magnitude of this voltage by difficulty in providing adequate insulation.

The terminal voltage of such generators depends, among other things, on the number of coils in series in each phase of the stator winding. The coils are normally arranged in identical groups of 60 electrical degrees spread, the coils within each group being connected in series. In a two-pole generator there are six such groups and diametrically opposite groups are connected either in series or in parallel to form one phase of the three-phase winding.

One method of keeping the terminal voltage to a minimum is to connect the groups of coils electrically in parallel and to select the number of slots in the stator such that the number of coils in series in each group is the minimum. This means reducing the number of stator slots to a minimum, but there are disadvantages associated with the adoption of less than about 42 slots and this determines the minimum permissible terminal voltage for a given size of machine.

Another method is to sub-divide the coils in each group into, for example, two sub-groups, connecting the coils in each sub-group in series and the two sub-groups in parallel. It is usual, however, for the coils in the winding to be short pitched or chorded in order to reduce the harmonic content of the voltage waveform and it is found that in a chorded winding, the voltages in such sub-groups are not identical. The difference can be either in magnitude or in phase depending on design, but in either case connection of the sub-groups in parallel results in inadmissible circulating currents in the winding.

The object of the present invention is to provide alternating current electrical apparatus capable of providing large outputs at acceptable terminal voltages without any of the limitations of the aforementioned known methods.

The invention consists in multi-phase alternating current electrical apparatus comprising a multi-phase alternating current dynamo-electric machine and multi-phase transformer means connected thereto, said machine having a stator winding comprising a plurality of separate three-phase windings, the stator winding as a whole being such that each phase voltage is equal in magnitude but has a phase displacement with respect to its corresponding voltage in the other three-phase winding or windings, the phase displacement between the respective phase voltages being equal and the said transformer means having one set of windings connected to the windings of the machine and another set connected to a three-phase supply.

The invention also consists in apparatus in accordance with the preceding paragraph in which the dynamo-electric machine is an alternating current generator having two three-phase stator windings, and the transformer means comprise a single transformer having two primary windings and a common secondary winding, one of the primary windings being in star connection and connected to one three-phase winding of the generator while the other primary winding is in delta connection and connected to the other three-phase winding of the generator, while the secondary winding of the transformer is in star connection and connected to the supply.

The invention also consists in apparatus in accordance with the first of the preceding two paragraphs in which the dynamo-electric machine is an alternating current generator having two three-phase stator windings and the transformer means comprise two three-phase transformers, the primary winding of one transformer being in star connection and connected to one three-phase winding of the generator, while the secondary winding of said transformer is in star connection and connected to the supply, the primary winding of the other transformer being in delta connection and connected to the other three-phase winding of the generator, while the secondary winding of said other transformer is in star connection and connected to the supply.

The invention also consists in electrical apparatus in accordance with the preceding paragraph in which each three-phase transformer is constituted by three single phase transformers.

The invention also consists in electrical apparatus in accordance with the first of the preceding four paragraphs in which the dynamo-electric machine is an alternating current generator having two three-phase stator windings and the transformer means comprise three-separate single phase transformers, each with two primary windings and one secondary winding, three of the primary windings, that is one from each transformer, being in star connection and connected to one three-phase winding of the generator, while the remaining three primary windings are in delta connection and connected to the other three-phase winding of the generator, the three secondary windings being in star connection and connected to the supply.

The invention also consists in electrical apparatus substantially as described herein with reference to the accompanying diagrammatic drawings in which, FIGURE 1 shows one phase of a winding diagram of a double three-phase stator winding of an alternating current generator in accordance with one embodiment of the invention.

I have set forth with particularity in the appended claims those novel features and the like which I consider characteristic and definitive of my invention. The invention itself, both as to its organization and its operation, will best be understood from the following description of exemplary embodiments thereof.

Figure 1:
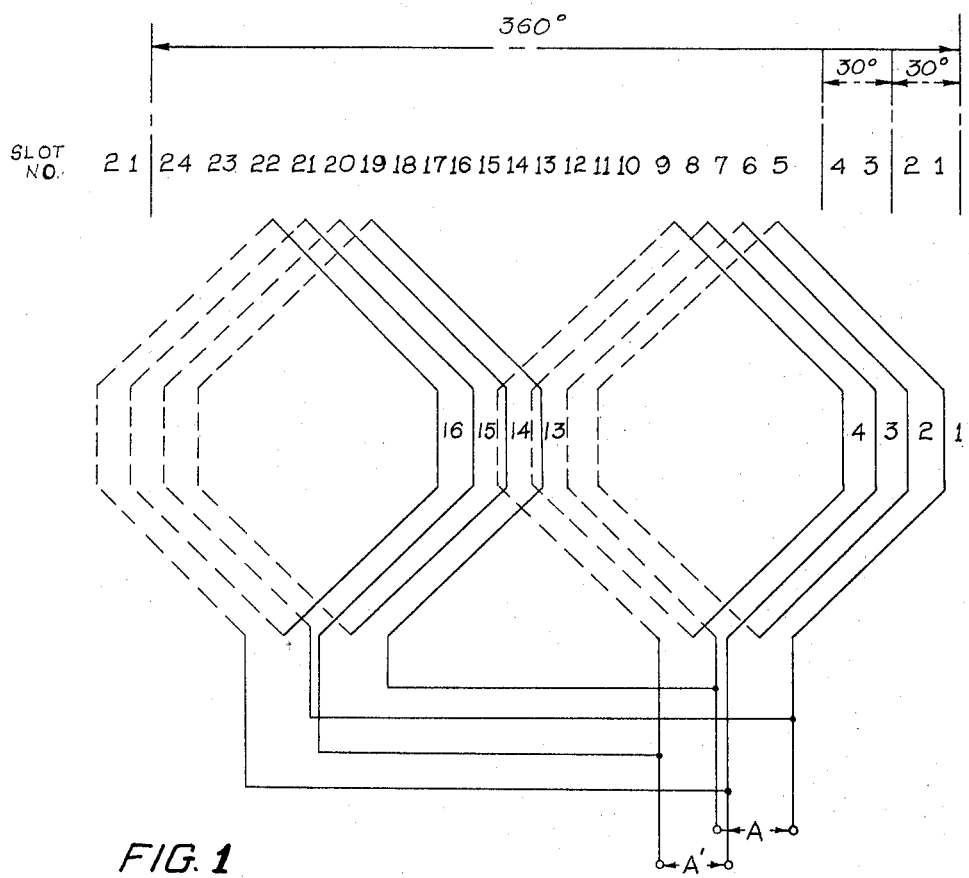

In carrying the invention into effect in the forms illustrated by way of example and referring first of all to FIGURE 1 a stator winding diagram for a two-pole alternating current generator having two three-phase windings is partially shown. For the sake of clarity a stator core having 24 slots is considered, though in practice this number of slots is inadmissibly small. As a further aid to clarity only one phase of each three phase winding is shown.

Each slot contains two coil sides, the "bottom" or radially outermost coil side in the slot being shown dotted. The coils forming the winding are grouped in pairs, each pair having coil sides in immediately adjacent slots. Thus coils 1 and 2 form a group, coils 3 and 4, . . . 13 and 14, 15 and 16 and so on. The coils of each group are connected in series with one another and diametrically opposite coils are connected in parallel to form a single phase of the double three-phase winding. Thus, coils 1 and 2 and diametrically opposite coils 13 and 14 form one phase (A) and coils 3 and 4, and coils 15 and 16 form another phase ($A^1$). As can be seen from FIGURE 2 the voltage in phase A leads the voltage in phase $A^1$ by 30 electrical degrees. Vectors B, $B^1$ and C, $C^1$ represent the voltages of the other phases not shown in FIGURE 1.

The phase voltages of one three-phase winding are represented by vectors A, B and C and the phase voltages of the other three-phase winding by vectors $A^1$, $B^1$ and $C^1$. It will be seen that the phase voltages are equal in magnitude and the phase displacement between a phase voltage of one three-phase winding and its corresponding phase voltage in the other three-phase winding is the same for each phase, namely 30 electrical degrees in the particular case shown.

Figure 2:
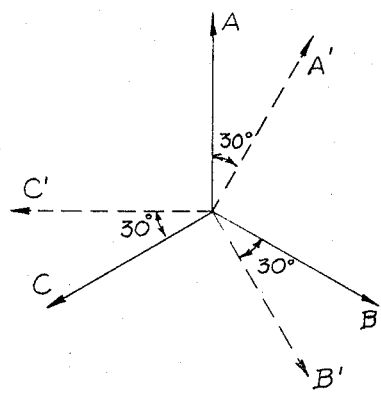
FIGURE 2 is a vector diagram showing the phase relationship between the phase voltages of the generator shown in FIGURE 1.
Figure 3:
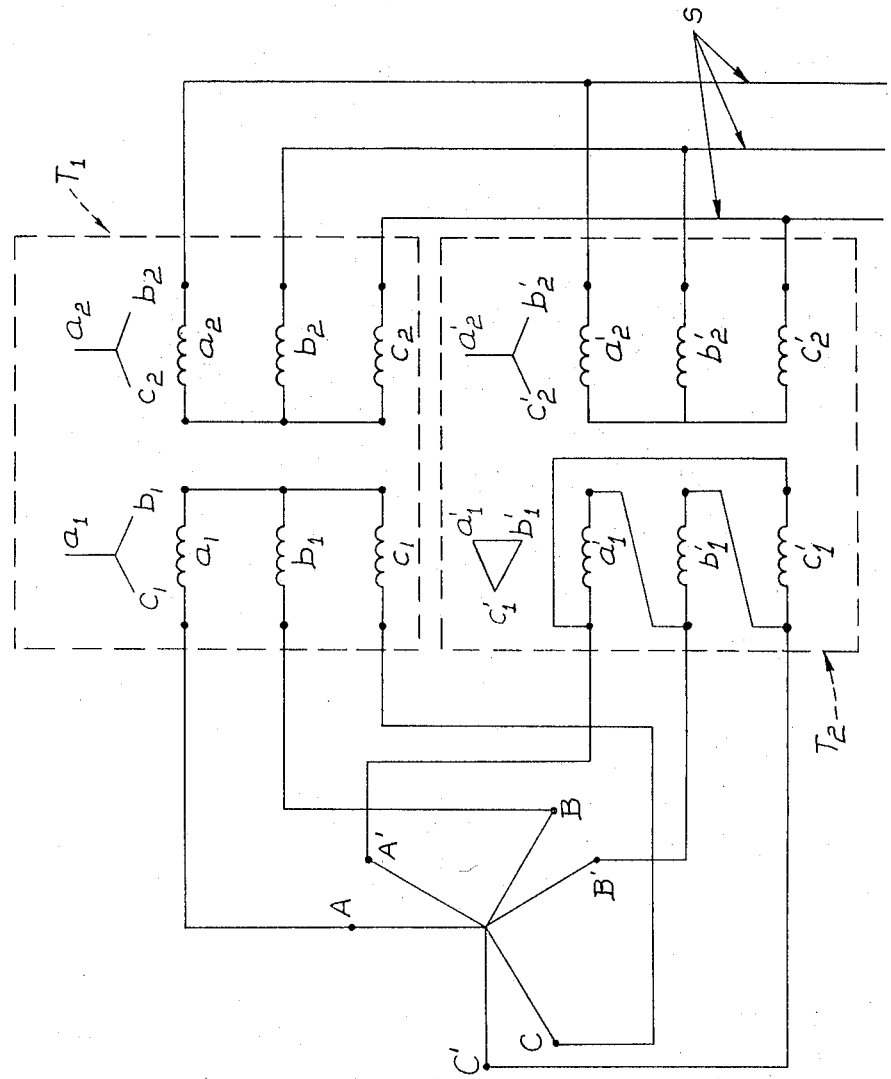
FIGURE 3 shows the generator of FIGURE 1 and transformer means in accordance with one preferred embodiment of the invention.

Referring to FIGURE 3 the double three-phase generator is represented in vector form as in FIGURE 2. The transformer means comprise two separate three-phase transformers $T_1$ and $T_2$. The phases of the primary winding of transformer $T_1$, are in star connection and are connected to each phase A, B, C, of the generator winding as shown. Thus phase $a_1$ of the primary winding of transformer $T_1$ is connected to phase A of the generator, phase $b_1$ of the primary winding is connected to phase B of the generator and so on.

Phases $a_2$, $b_2$ and $c_2$ of the secondary winding of transformer $T_1$, are in star connection and connected to the supply S as shown.

The phases $a_1^1$, $b_1^1$, and $c_1^1$ of the primary winding of transformer $T_2$ are in delta connection and connected to phases $A^1$, $B^1$ and $C^1$ of the generator as shown. The phases $a_2^1$, $b_2^1$ and $c_2^1$ of the secondary winding of transformer $T_2$ are in star connection and connected to the supply S as shown.

By means of the arrangement shown the phase voltages $A^1$, $B^1$ and $C^1$ are advanced by 30 electrical degrees so that they are in phase with the phase voltages A, B and C. The output on supply S is therefore a three-phase output with the voltages of each phase equal in magnitude. Because of the fact that the phase voltages are equal in magnitude and in phase, circulating currents are eliminated, and it is possible to keep the terminal voltage of the generator to a minimum by sub-dividing the groups of coils into sub-groups, connecting each of the coils of each sub-group in series and the sub-groups in parallel without introducing undesirable circulating currents. In this way it is possible to construct a generator of large output in which the terminal voltage is not excessive, thus simplifying manufacture and improving reliability. In some circumstances phase voltages on the secondary side of the transformer are not exactly equal in magnitude, but the circulating currents are still reduced to an acceptable value.

In an arrangement similar to that shown in FIGURE 3 both the secondary windings may be connected in delta as opposed to the star connection shown. In another form one secondary may have a star connection and the other a delta connection. In such a case both primary windings would have a star connection or both would have a delta connection. In each case the arrangement would be such that the phase voltages $A^1$, $B^1$ and $C^1$ are advanced by 30 electrical degrees.

A further permissible modification of the arrangement of FIGURE 3 is to replace each three-phase transformer by three single phase transformers. If each phase winding of the transformers $T_1$ and $T_2$ is considered as a separate single phase transformer the arrangement shown illustrates this embodiment.

Figure 4:
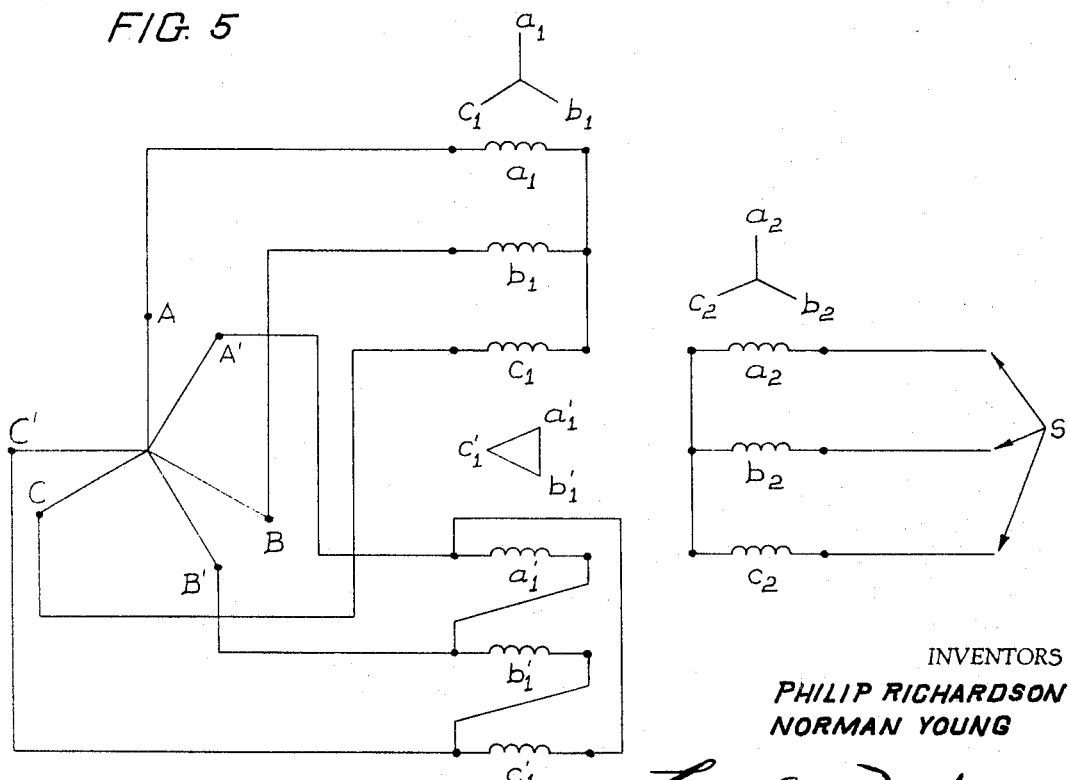
FIGURE 4 shows the generator of FIGURE 1 and transformer means in accordance with an alternative embodiment of the invention.

Referring to FIGURE 4, the transformer means comprise a single transformer having two primary windings and a common secondary winding. Phases $a_1$, $b_1$ and $c_1$ of one primary winding are in star connection and are connected to phases A, B and C of the generator while phases $a_1^1$, $b_1^1$ and $c_1^1$ of the other primary winding are in delta connection and connected to phases $A^1$, $B^1$ and $C^1$ of the generator.

The secondary winding $a_2$, $b_2$ and $c_2$ is in star connection and is connected to the terminals of supply S as shown.

As an alternative the secondary windings may be in delta connection and with the primary windings arranged so as to obtain the necessary phase advance.

Figure 5:
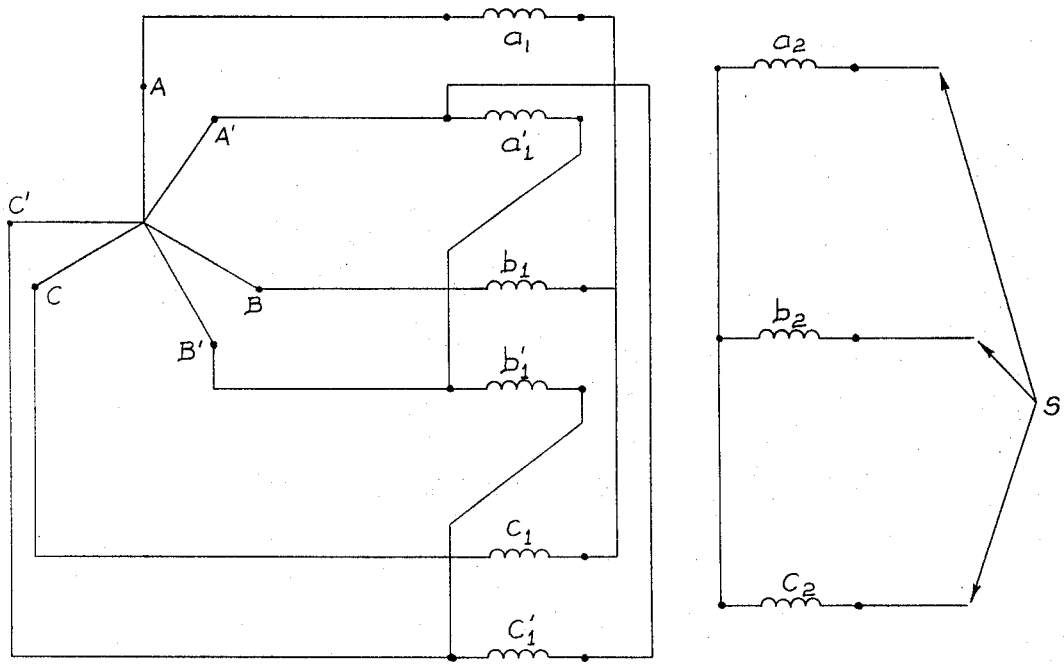
FIGURE 5 shows the generator of FIGURE 1 and transformer means in accordance with a further embodiment of the invention.

It is a further embodiment shown in FIGURE 5, the transformer means comprise three separate single phase transformers each having two primary windings and one secondary winding. One set of primary windings $a_1$, $b_1$ and $c_1$ comprising one primary phase from each of the three transformers are in star connection and connected to the phases A, B and C of the generator while the remaining three primary windings $a_1^1$, $b_1^1$ and $c_1^1$ are in delta connection and connected to the phases $A^1$, $B^1$ and $C^1$. The secondary windings $a_2$, $b_2$ and $c_2$ are in star connection and are connected to the supply S. As in the case of the arrangement of FIGURES 3 and 4 the secondary windings may be in a delta connection instead of star, with the primary windings arranged in such a way as to produce the necessary phase advance.

With the arrangement described a chorded winding, which is a feature of smaller machines, can be retained, thus reducing the space harmonics normally produced by the 5th and 7th harmonic components of a three-phase winding, and thereby reducing the circulating currents which flow in the rotor surface and give rise to load losses in that surface. In addition the designer is given an improved freedom to choose the number of slots in the stator, and thus it is permissible to use a design in which the electromagnetic forces in the windings due to bus-bar faults are reduced.

While the embodiment described incorporates a double-three-phase generator, i.e., two three-phase windings, more than two three-phase windings, with an appropriate number of transformer windings, may be used if practical considerations permit.

The invention can be applied equally to two-pole or multipole machines. It can be applied to motors and generators alike and to synchronous and asynchronous machines. It can also be applied to synchronous condensers.

Having thus described our invention in the manner prescribed by the patent statutes, we claim:

1. Multi-phase alternating current electrical apparatus comprising a multi-phase alternating current dynamo-electric machine, said machine having a stator winding comprising a plurality of separate three-phase windings in which the phase voltages of the three-phase windings are equal in magnitude but each phase voltage of one three-phase winding has a phase displacement with respect to its corresponding phase voltage in each other three-phase winding, the phase displacements between the phase voltages of any one three-phase winding and the respective corresponding phase voltages of another three-phase winding being equal; and multi-phase transformer means having one set of windings connected to the windings of the machine and another set for connection to a three-phase supply.

2. Apparatus as claimed in claim 1 in which the dynamoelectric machine is an alternating current generator having two three-phase stator windings, and the transformer means comprise a single transformer having two primary windings and a common secondary winding, one of the primary windings being in star connection and connected to one three-phase winding of the generator while the other primary winding is in delta connection and connected to the other three-phase winding of the generator, while the secondary winding of the transformer is in star connection and adapted to be connected to the supply.

3. Apparatus as claimed in claim 1 in which the dynamoelectric machine is an alternating current generator having two three-phase stator windings and the transformer means comprise two three-phase transformers, the primary winding of one transformer being in star connection and connected to one three-phase winding of the generator, while the secondary winding of said transformer is in star connection and adapted to be connected to the supply, the primary winding of the other transformer being in delta connection and connected to the other three-phase winding of the generator, while the secondary winding of said other transformer is in star connection and adapted to be connected to the supply.

4. Apparatus as claimed in claim 3 in which each three-phase transformer is constituted by three single-phase transformers.

5. Apparatus as claimed in claim 1 in which the dynamoelectric machine is an alternating current generator having two three-phase stator windings and the transformer means comprise three separate single-phase transformers, each with two primary windings and one secondary winding, one primary winding from each transformer being in star connection and connected to one three-phase winding of the generator, while the remaining three primary windings are in delta connection and connected to the other three-phase winding of the generator, the three secondary windings being in star connection and adapted to be connected to the supply.

6. Multi-phase alternating current electrical apparatus comprising an alternating current generator having at least two separate three-phase stator windings for generating phase voltages of equal magnitude with the phase voltages of one three-phase winding being uniformly displaced with respect to the corresponding phase voltages of the other three-phase winding, and multi-phase transformer means for bringing into phase the corresponding phase voltages of the separate three-phase windings, said transformer means having one set of windings connected to the windings of the machine and another set of windings adapted to be connected to a three-phase supply.

References Cited

UNITED STATES PATENTS 2,812,488 11/1957 Wright _____ 323—112 X
2,886,762 5/1959 Polasek _____ 322—20 X ORIS L. RADER, *Primary Examiner.*

H. HUBERFELD, *Assistant Examiner.*

U.S. Cl. X.R.

310—198, 210